(12) United States Patent
He et al.

(10) Patent No.: US 7,963,831 B2
(45) Date of Patent: Jun. 21, 2011

(54) INTEGRATED SYSTEM AND METHOD OF BATTERY COOLING FOR A HYBRID OR FUEL CELL VEHICLE

(75) Inventors: Hua He, North Potomac, MD (US); Michael J. Gorman, Pinckney, MI (US); Joseph F. Mercurio, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

(21) Appl. No.: 11/668,154

(22) Filed: Jan. 29, 2007

(65) Prior Publication Data
US 2008/0182499 A1    Jul. 31, 2008

(51) Int. Cl.
*B60H 1/26* (2006.01)
*B60K 11/00* (2006.01)
(52) U.S. Cl. ...................... 454/142; 180/68.1
(58) Field of Classification Search ................. 454/142; 320/2; 180/68.1
See application file for complete search history.

(56) References Cited

U.S. PATENT DOCUMENTS

| 4,347,472 A * | 8/1982 | Lemelson ............... 320/108 |
| 5,392,873 A | 2/1995 | Masuyama et al. |
| 6,662,891 B2 * | 12/2003 | Misu et al. ............... 180/68.1 |
| 2004/0062955 A1 * | 4/2004 | Kubota et al. ............ 429/9 |

FOREIGN PATENT DOCUMENTS
EP    1153803 A2    11/2001

* cited by examiner

*Primary Examiner* — Steve McAllister
*Assistant Examiner* — Helena Kosanovic
(74) *Attorney, Agent, or Firm* — Quinn Law Group, PLLC

(57) ABSTRACT

An acoustically improved cooling system is provided for an energy storage system including a battery with air from a carpeted vehicle compartment, the cooling system including: a carpet portion sufficiently spaced from a floor panel of a vehicle to define a cavity forming an air passage through which air may flow and including an air inlet opening integrally formed therein through which the air from the compartment may be drawn; a fan for circulating air from the cavity into heat exchange relationship with the battery for cooling the battery; and a vent opening connecting the cavity and the fan in air flow communication. The frame is curved above the vent opening, to force noise reflection off the curved portion of the frame. A sound absorption layer is installed underneath the curved portion of the frame for noise attenuation.

13 Claims, 1 Drawing Sheet

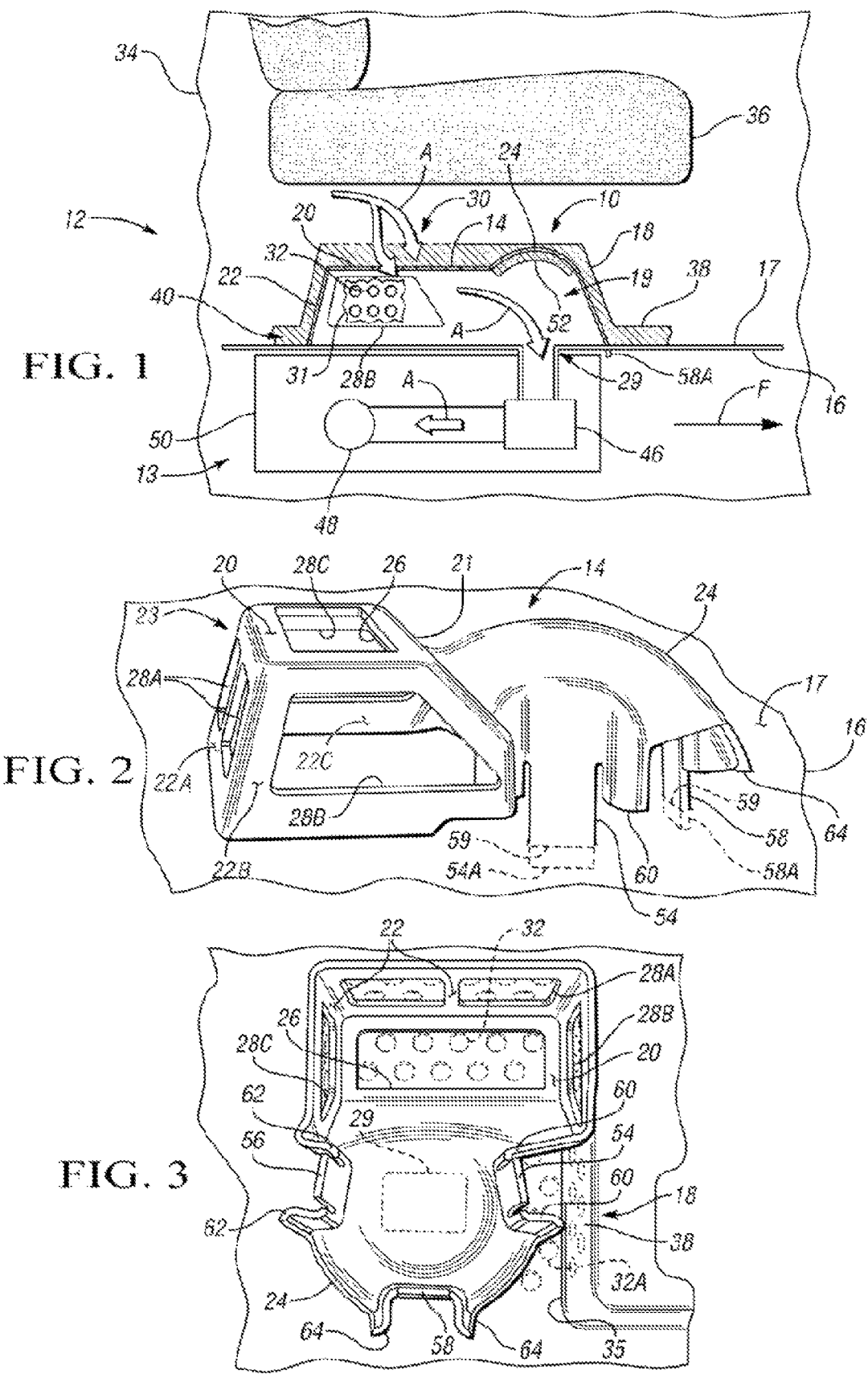

INTEGRATED SYSTEM AND METHOD OF BATTERY COOLING FOR A HYBRID OR FUEL CELL VEHICLE

TECHNICAL FIELD

The invention relates to an acoustically improved cooling system and method for cooling an energy storage system including a battery with air drawn from a carpeted vehicle compartment.

BACKGROUND OF THE INVENTION

Hybrid vehicles utilize electrical storage batteries of large capacity to store energy recaptured during decelerations of the vehicle. In operation, the batteries are sources of heat. The heat must be rejected to the environment to preclude shortened operational life of the battery packs. Drawing the needed cooling air from within the cabin assures a narrower range of cooling air temperatures than would be the case using outside air. However, the use of cabin air also introduces fan noise through the path to the air inlet.

SUMMARY OF THE INVENTION

The invention relates to an acoustically improved cooling system and method for cooling an energy storage system including a battery with air drawn from a carpeted vehicle compartment. More specifically, it relates to an integrated design of battery cooling air inlet, acoustics and carpet in a hybrid or fuel cell vehicle.

The cooling system includes local shaping and perforation of a carpet portion that serves as an air inlet opening for cooling and also attenuates the direct noise generated by the system. The cooling system achieves noise reduction by a) incorporating a convoluted flow path to reduce noise, i.e., eliminating a direct noise path from the system's vent opening to the front of the vehicle passenger compartment; b) employing sound absorptive foam in a curved portion above the system's vent opening and c) utilizing carpet underlayment of engineered acoustic dissipative material. The system also prevents inadvertent obstruction of air flow to the system by objects such as newspapers and magazines.

An acoustically improved cooling system is provided for an energy storage system including a battery with cooling air drawn from a carpeted vehicle compartment, the cooling system including: a carpet portion sufficiently spaced from a floor panel of a vehicle to define a cavity forming an air passage through which air may flow and including an air inlet opening integrally formed therein through which the air from the compartment may be drawn; a fan for circulating air from the cavity into heat exchange relationship with the battery for cooling the battery; and a vent opening connecting the cavity and the fan in air flow communication.

In another aspect of the invention, the cooling system includes a frame mounted with respect to the floor panel of the vehicle for supporting the carpet portion, thereby spacing the carpet portion with respect to the floor panel of the vehicle. In another aspect of the invention, the frame includes a planar surface, a plurality of side walls, a curved portion; wherein the planar surface has at least one opening; and wherein the side walls have at least one side opening.

In another aspect of the invention, the air inlet opening includes at least one perforated hole. In another aspect of the invention, the carpet portion comprises a carpet appearance layer, in which the air inlet opening is integrally formed; and a carpet acoustic layer in contact with the carpet appearance layer. In another aspect of the invention, the total area of the air inlet opening is larger than the total area of the vent opening.

In another aspect of the invention, the curved portion of the frame is positioned sufficiently above the vent opening to force noise reflection off the curved portion; and the cooling system further includes a sound absorption layer installed underneath the curved portion for noise attenuation.

In yet another aspect of the invention, a method is provided of cooling a battery with air from a carpeted vehicle compartment which includes: spacing a carpet portion from a floor panel of the vehicle compartment to provide a cavity defining an air passage through which the air may flow; integrally forming an air inlet opening in the spaced carpet portion sufficiently sized to permit air from the vehicle compartment to be drawn through the air inlet opening into the cavity; drawing air from the compartment through the integrally formed air inlet opening into the cavity and circulating the drawn air into heat exchange with the battery for cooling the battery.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic side section of a raised carpet portion and frame for the carpet portion in a battery cooling system in accordance with a preferred embodiment of the invention;

FIG. 2 is a proportionally enlarged perspective top view of the frame on the vehicle floor panel for supporting the carpet portion; and FIG. 3 is a schematic up-looking view from below the vehicle floor as if looking through a transparent floor panel to show the bottom or under surface of the carpet portion with the frame nested therewithin.

DESCRIPTION OF THE PREFERRED EMBODIMENTS

An acoustically improved cooling system and method for cooling an energy storage system including a battery with air drawn from a carpeted vehicle compartment is provided. In the preferred embodiment, the cooling system draws passenger or vehicle compartment air for cooling a battery in a hybrid or fuel cell vehicle's energy storage system. However, the invention may be applied to any type of cooling system in a vehicle that withdraws air from the passenger or vehicle compartment for cooling.

FIG. 1 is a schematic side section of a cooling system 10 in a vehicle 12 with an energy storage system 13. A support structure or frame 14 is mounted above the floor panel 16 of the vehicle 12. A carpet portion 18 is mounted above and shaped by the frame 14. The frame 14 raises the under side of carpet portion 18 a finite distance above the floor panel 16 of the vehicle 12 whereby to define an air plenum or cavity 19 between the floor panel 16 and the frame 14, as shown in FIG. 1. The frame 14 is also used to sufficiently support the carpet portion 18 to prevent the carpet portion 18 from buckle or crush. The frame 14 may be made of plastic or other suitable materials.

FIG. 2 is a proportionally enlarged perspective top view of the frame 14 on the floor panel 16. FIG. 3 is a schematic up-looking view from below the vehicle floor as if looking through a transparent floor panel to show the bottom surface of the carpet portion 18 with the frame 14 nested therewithin. As shown in FIG. 2, the frame 14 includes a first portion 23 a front wall 21 and a curved portion 24. The first portion 23 of the frame 14 includes a planar surface 20, first side wall 22A, second side wall 22B and third side wall 22C, shown in FIG. 2. The planar surface 20 of the frame 14 has at least one opening 26. The first side wall 22A, second side wall 22B and third side wall 22C also have at least one respective side opening each. Also shown in FIG. 2 are first side opening 28A, second side opening 28B and third side opening 28C in the first side wall 22A, second side wall 22B and third side wall 22C, respectively.

The curved portion 24 of the frame 14 is positioned above a vent opening 29, which is the inlet duct to the energy storage system 13, shown in FIG. 1. As discussed below, the frame 14 aids in reducing noise by forcing noise generated by the system to reflect off the underside of the curved portion 24 and employing a sound absorption layer 52 on the underside of the curved portion 24 to absorb such noise.

An air inlet opening 30 is integrally formed in the carpet portion 18, shown in FIG. 1. The air inlet opening 30 includes one or more holes 32 perforated at least partially through an appearance layer 38 of the carpet portion 18. As shown in FIG. 3, the holes 32 may extend over or communicate with opening 26 in the planar surface 20, and first side opening 28A, second side opening 28B, and third side opening 28C in the first side wall 22A, the second side wall 22B and the third side wall 22C, respectively of the frame 14. In FIG. 1, a cut-away 31 shows the holes 32 in the carpet portion 18 above the second side opening 28B of the frame 14. Additionally, the holes 32 forming air inlet opening 30 may extend over the curved portion 24 of the frame 14. As shown in FIG. 3, perforations 32A also assist in communicating airflow from the passenger or vehicle compartment 34 to the space 35 at the outer side of the frame 14 which surrounds its curved portion 24. To minimize air flow restriction, the size and number of holes 32 on the carpet portion 18 are such that the total opening area of the holes 32 is larger than the total area of the vent opening 29 on the energy storage system 13, as discussed below.B2

Air A is drawn from the front of the passenger or vehicle compartment 34 of the vehicle 12 into the air inlet opening 30 formed by the holes 32. Preferably, the carpet portion 18 as well as the air inlet opening 30 is located below the driver's seat 36 at the front F of the vehicle.

In the preferred embodiment, the carpet portion 18 is two-layered, with the holes 32 perforated through one layer of the carpet portion 18 but not the other layer. Alternatively, a single-layer carpet portion 18 may be used. The carpet portion 18 includes a carpet appearance layer 38 and a carpet acoustic layer 40 adjacent to the carpet appearance layer 38, shown in FIG. 1. The holes 32 of the air inlet opening 30 are cut in the carpet appearance layer 38, without piercing the carpet acoustic layer 40. Hydraulic force such as waterjets may be used to cut the holes 32, where the force of the waterjet is controlled such that the holes are made in the carpet appearance layer 38, without piercing the carpet acoustic layer 40. Other suitable methods may also be used. The holes 32 are shown in dashed circles in FIG. 3 to indicate pierced holes in the carpet appearance layer 38, but not in the carpet acoustic layer 40. The carpet acoustic layer 40 preferably extends continuously or coextensively over the frame 14. The carpet acoustic layer 40 is sometimes referred to as a decoupler because it serves to break the acoustic path between the floor sheet metal of the floor panel 16 and the carpet appearance layer 38.

Thus, the carpet portion 18 is locally shaped to fit over the frame 14 in a manner to form a cavity 19 into which air A is drawn from the air inlet opening 30, integrally formed as holes 32 in the appearance layer of the carpet portion 18. As shown in FIG. 1, the cavity 19 defines an air passage having a vent opening 29 through which the air A flows. The cavity 19 is in air flow communication with the vent opening 29. The vent opening 29 is the inlet duct to the energy storage system 13. A blower or fan 46 is mounted directly below the vent opening 29. The vent opening 29 interconnects the cavity 19 and the fan 46. The fan 46 blows or circulates the air A into heat exchange with the battery 48 for cooling the battery. The fan 46 may be placed in an exterior module 50, as part of the energy storage system 13 of the vehicle 12.

To minimize air flow restriction, the size and number of holes 32 on the carpet portion 18 are such that the total opening area of the holes 32 is larger than the area of the vent opening 29, as mentioned above. Preferably, the holes 32 have an open area totaling more than 60% of the area of the vent opening 29.

The raised shape of the carpet portion 18 above the rest of the carpeted floor panel 16 prevents small articles from dropping into the selectively perforated holes 32, 32A of the air inlet opening 30, and reduces the risk of a newspaper or similar items from blocking the air flow A to cavity 19 and fan 46.

Noise Attenuation

The frame 14 includes a curved portion 24 positioned sufficiently above the vent opening 29 such that noise emanating from the fan 46 is forced to reflect off the surface of the curved portion 24, shown in FIG. 1. A sound absorptive layer 52 is installed on the underside of the curved portion 24 and above the vent opening 29. The sound absorption layer 52 is in contact with the curved portion 24 and absorbs noise reflected off the curved portion 24. In the preferred embodiment, foam is used for the sound absorptive layer 52. The foam is an open-cell acoustic absorptive foam, available in various formulations from several suppliers. Other suitable materials may also be used.

Acoustically, the raised shape of the carpet portion 18 allows the blower or fan noise to bend and then pass through the holes 32 in the carpet portion 18. Noise emanating from the fan 46 is further attenuated as it passes through the carpet acoustic layer 40. The carpet acoustic layer 40 is sufficiently porous to attenuate direct sound passing through the multiple small openings of the carpet acoustic layer 40. In the preferred embodiment, the carpet acoustic layer 40 is made of an engineered acoustic dissipative material which exhibits superior sound absorption capability compared to conventional carpet material. A material such as "SonoTec®", available from Lear Corporation of Southfield, Mich., may be used to form the carpet acoustic layer 40. Other suitable materials may also be used.

Thus, the cooling system 10 eliminates a direct path from the vent opening 29 to the front of the passenger or vehicle compartment 34. Incorporating a convoluted flow path enables greater reduction of noise.

Positioning of Frame

For ease of positioning the frame 14 with respect to the floor panel 16, at least one locating tab connected to the curved portion 24 may be formed. FIGS. 2 and 3 show locating tabs 54, 56 and 58 formed at the base of the curved portion 24. The lower portion of the locating tabs 54, 56 and 58 extends below the surface 17 of the floor panel 16 and fits into slots 59 on the surface 17 of the floor panel 16. FIG. 2 shows lower portions 54A and 58A of the locating tabs 54 and 58, respectively, extending below the surface 17 of the floor panel 16. The locating tabs 54, 56 and 58 prevent the frame 14 from sliding with respect to the floor panel 16.

Furthermore, at least one support tab connected to the curved portion 24 may be formed for retaining the frame 14 with respect to the floor panel 16. FIG. 3 shows support tabs 60, 62 and 64, which rest on the surface of the floor panel 16 and preclude the possibility of the curved portion 24 falling into the vent opening 29. Preferably, the support tabs 60, 62 and 64 are located on either side of and adjacent to locating tabs 54, 56 and 58, respectively.

In summary, an acoustically improved cooling system 10 is provided for an energy storage system 13 including a battery 48 with air A drawn from a carpeted vehicle compartment 34, the cooling system including: a carpet portion 18 sufficiently spaced from a floor panel 16 of a vehicle 12 to define a cavity 19 forming an air passage through which air A may flow and including an air inlet opening 30 integrally formed therein through which the air A from the vehicle compartment 34 may be drawn; a fan 46 for circulating air A from the cavity into heat exchange relationship with the battery 48 for cooling the battery 48; and a vent opening 29 connecting the cavity 19 and the fan 46 in air flow communication.

A method is provided of cooling a battery 48 with air A drawn from a carpeted vehicle compartment 34 which includes: spacing a carpet portion 18 from a floor panel 16 of the vehicle compartment 34 to provide a cavity 19 defining an air passage through which air A may flow; integrally forming an air inlet opening 30 in the spaced carpet portion 18 sufficiently sized to permit air A from the vehicle compartment 34 to be drawn through the air inlet opening 30 into the cavity 19; drawing air A from the vehicle compartment 34 through the integrally-formed air inlet opening 30 and the cavity 19; and circulating the drawn air A into heat exchange with the battery 48 for cooling the battery 48.

While the best modes for carrying out the invention have been described in detail, those familiar with the art to which this invention relates will recognize various alternative designs and embodiments for practicing the invention within the scope of the appended claims.

The invention claimed is:

1. An acoustically improved cooling system for an energy storage system including a battery and a carpeted vehicle compartment comprising:
   a carpet portion sufficiently spaced from a floor panel of a vehicle to at least partially define a cavity;
   an air inlet opening integrally formed in said carpet portion, wherein air from said compartment may be drawn into said cavity through said air inlet opening;
   a frame in contact with said carpet portion and mounted above said floor panel of said compartment for supporting said carpet portion;
   wherein the frame includes a planar surface, first side wall, second side wall and third side wall;
   wherein said air from said compartment enters into said cavity through respective openings in each of said planar surface, said first side wall, said second side wall and said third side wall;
   a fan for circulating air from said cavity into heat exchange relationship with said battery for cooling said battery, wherein the fan and the battery are located below the floor panel of the vehicle; and
   a vent opening integrally formed in the floor panel of the vehicle, the vent opening connecting said cavity and said fan in air flow communication
   said frame further comprising a front wall and a curved portion extending forward from said front wall, the curved portion being substantially above the vent opening.

2. The cooling system of claim 1, wherein, said curved portion at least partially defines said cavity.

3. The cooling system of claim 2, wherein said frame further comprises at least one locating tab connected to said curved portion for positioning said frame with respect to said floor panel; and wherein said locating tab extends beyond the surface of said floor panel.

4. The cooling system of claim 2, wherein said frame further comprises at least one support tab connected to said curved portion for retaining said frame with respect to said floor panel; and wherein said support tab rests on the surface of said floor panel.

5. The cooling system of claim 2, wherein said carpet portion comprises a carpet appearance layer, in which said air inlet opening is integrally formed; and a carpet acoustic layer in contact with said carpet appearance layer.

6. The cooling system of claim 5, wherein said air inlet opening comprises at least one hole perforated through said carpet appearance layer.

7. The cooling system of claim 2, further comprising:
   a sound absorption layer in contact with said curved portion to absorb said noise reflected off said curved portion.

8. A cooling and noise attenuation system for a battery mounted with respect to a carpeted vehicle compartment comprising:
   a carpet portion raised a finite distance above a floor panel of said vehicle compartment to at least partially define a cavity;
   a frame in contact with said carpet portion and mounted above said floor panel of said vehicle compartment for supporting said carpet portion said finite distance above said floor panel of said vehicle;
   an air inlet opening integrally formed in said carpet portion, through which air from said vehicle compartment of said vehicle may be drawn into said cavity;
   a fan for blowing said air through said cavity to said battery for cooling, wherein the fan and the battery are located below the floor panel of the vehicle;
   a vent opening integrally formed in the floor panel of the vehicle, the vent opening interconnecting said cavity and said fan;
   wherein said frame comprises a planar surface, three side walls and a front wall; wherein a curved portion of the frame extends forward from the front wall and is substantially above said vent opening to force noise reflection off said curved portion;
   wherein said curved portion at least partially defines said cavity; and
   a sound absorption layer in contact with said curved portion to absorb said noise reflected off said curved portion.

9. The cooling and noise attenuation system of claim 8, wherein the area of said air inlet opening is larger than the area of said vent opening.

10. The cooling system of claim 2, wherein the fan and the battery are positioned in an exterior module located below the floor panel of the vehicle.

11. The cooling system of claim 2, wherein the frame and the curved portion are a one-piece structure.

12. The cooling system of claim 1, wherein the area of said air inlet opening is larger than the area of said vent opening.

13. An acoustically improved cooling system for an energy storage system including a battery and a carpeted vehicle compartment comprising:
- a carpet portion raised a finite distance above a floor panel of said vehicle compartment to at least partially define a cavity;
- an air inlet opening integrally formed in said carpet portion, wherein air from said vehicle compartment may be drawn into said cavity through said air inlet opening;
- a fan for blowing said air through said cavity to said battery for cooling, wherein the fan and the battery are located below the floor panel of the vehicle;
- a vent opening integrally formed in the floor panel of the vehicle, the vent opening interconnecting said cavity and said fan;
- a frame mounted with respect to said floor panel of said vehicle for supporting said carpet portion;
- wherein said frame comprising a planer surface, three side walls, a front wall and a curved portion extending forward from said front wall;
- wherein said curved portion is substantially aligned above said vent opening to force noise reflection off said curved portion; and
- a sound absorption layer in contact with said curved portion to absorb said noise reflected off said curved portion.

* * * * *